United States Patent [19]
Berkoz et al.

[11] 3,896,139
[45] July 22, 1975

[54] PROCESS FOR PREPARING 3-(4-OR-5-AZIDOCARBONYLTHIAZOL-2-OXY)-PROPANEDIOL-1,2-ACETONIDES

[75] Inventors: Belig M. Berkoz; John A. Edwards, both of Los Altos; John H. Fried, Palo Alto, all of Calif.

[73] Assignee: Syntex (U.S.A.) Inc., Palo Alto, Calif.

[22] Filed: Mar. 14, 1974

[21] Appl. No.: 451,194

[52] U.S. Cl... 260/302 R; 260/302 E; 260/306.8 R; 424/270
[51] Int. Cl............................................. C07d 91/32
[58] Field of Search .................. 260/302 R, 306.8 R

[56] References Cited
UNITED STATES PATENTS 3,631,055   12/1971   Possglt et al. ................... 260/302 R
3,654,295   4/1972   Dabritz et al. ................... 260/302 R

*Primary Examiner*—R. J. Gallagher
*Attorney, Agent, or Firm*—Lawrence S. Squires; William B. Walker

[57] ABSTRACT

Processes for preparing 3-(4- or 5-substituted thiazol-2-oxy)-propanediol 1,2-acetonides. The processes are characterized by the steps of treating the desired lithium salt of 3-(4- or 5-carboxy-thiazol-2-oxy)-propanediol 1,2-acetonide with an alkyl chloroformate to yield the corresponding 4'-or 5'-alkylcarbonyldioxycarbonyl derivative which is then reacted with an alkali metal azide to yield the corresponding 3-(4- or 5-azidocarbonylthiazol-2-oxy)-propanediol 1,2-acetonide. The azidocarbonyl derivative can be readily rearranged to the isocyanato derivative which is an intermediate for cardiovascular agents useful for the treatment of mammals.

9 Claims, No Drawings

PROCESS FOR PREPARING 3-(4-OR-5-AZIDOCARBONYLTHIAZOL-2-OXY)-PROPANEDIOL-1,2-ACETONIDES

BACKGROUND OF THE INVENTION

1. Field of the Invention

This invention relates to processes of preparing 3-(4- or 5-substituted thiazol-2-oxy)-propanediol 1,2-acetonides. In a further aspect this invention relates to methods of preparing 3-(4- or 5-azidocarbonylthiazol-2-oxy)-propanediol 1,2-acetonide and 3-(4- or 5-isocyanatothiazol-2-oxy)-propanediol 1,2-acetonide. In another aspect this invention relates to methods of preparing 3-(4- or 5-substituted carbonylaminothiazol-2-oxy)-propanediol 1,2-acetonides.

SUMMARY OF THE INVENTION

In summary, the processes of our invention comprise carboxylating the desired 3-(4- or 5-lithiothiazol-2-oxy)-propanediol 1,2-acetonide to yield the corresponding lithium carboxylate salt which in turn is treated with a lower alkyl chloroformate to yield the corresponding alkoxycarbonyloxycarbonyl which in turn is treated with an alkali metal azide to yield the corresponding 3-(4- or 5-azidocarbonylthiazol-2-oxy)-propanediol 1,2-acetonide compound. The corresponding 4- or 5-isocyanato compound can be prepared by refluxing the 4- or 5-azidocarbonylthiazole product in an aromatic solvent. The 3-(4- or 5-substituted carbonylaminothiazol-2-oxy)-propanediol 1,2-acetonides can be prepared by treating the corresponding 4- or 5-isocyanatothiazole derivative with a Grignard reagent having the desired substituent or an alcohol having the desired ether grouping (eg. RO—H).

The invention will be further described herein below.

FURTHER DESCRIPTION OF THE INVENTION AND PREFERRED EMBODIMENTS

The process of our invention can be conveniently represented by the following overall schematic reaction sequence:

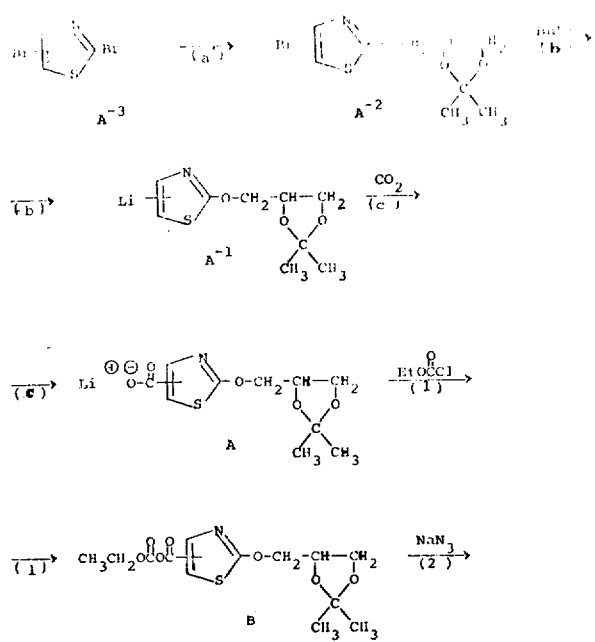
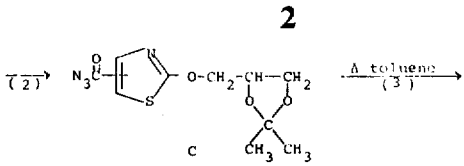
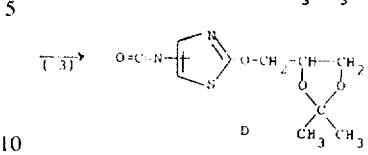

Steps $a$, $b$ and $c$ illustrate the preparation of the initial lithium carboxy salt used as the initial starting material (formula A) in our process. Step $a$ of the above process can be conveniently effected by treating the 2,4-dibromothiazole or 2,5-dibromothiazole starting material with a glycerol acetonide, in a suitable inert organic solvent, in the presence of an alkali metal hydride. Typically, this treatment is conducted at temperatures in the range of about from 20°C to reflux for about from a few minutes to 20 hours, using mole ratios in the range of about 1 to 100 moles of glycerol acetonide per mole of dibromothiazole ($A^{-3}$). However, temperatures, reaction times, and mole ratios both above and below can also be used. Suitable alkali metal hydrides which can be used include, for example, sodium hydride, potassium hydride, calcium hydride, lithium hydride and the like. Suitable inert organic solvents which can be used include, for example, monoglyme, tetrahydrofuran, diglyme, dimethylformamide, and the like. Also an excess of glycerol acetonide can be used as the solvent. Further by using the optically pure (+) glycerol acetonide isomer (see *J. Biol. Chem.*, v. 128, p. 463 (1939)) or the optically pure (−) glycerol acetonide isomer (see *J. Am. Chem. Soc.*, v. 67, p. 944 (1945)), the corresponding (+) or (−) optically active isomer of formula $A^2$ is obtained. Correspondingly, wherein a (+) or (−) isomer mixture of the glycerol acetonide is used, the product will similarly be a mixture of isomers. This optically active isomer relationship between the starting materials and products exists throughout all the steps of various processes described herein. Also typically and conveniently, a racemic glycerol acetonide isomer mixture will be used and thus typically the product will correspondingly be a racemic mixture.

The 2,5-dibromothiazole and 2,4-dibromothiazole are known compounds and can be prepared according to procedures described in *Recueil des Travaux Chimiques des Pays Bas*, volume 73, page 325 (1964) and in *Bulletin de la Societe Chimique de France*, page 1735 (1962), respectively.

Step $b$ can be effected by treating the compound of formula $A^{-2}$ with an alkyl lithium reagent (preferably t- or n-butyllithium) in a suitable inert organic solvent. Typically this treatment is conducted at temperatures in the range of about from −10° to −150°C, preferably about from −60° to −80°C for about from 10 minutes to 2 hours, and preferably about from 15 minutes to 1 hour, using mole ratios in the range of about from 2 to 3 moles of alkyl lithium per mole of the compound of formula $A^{-2}$. Best results are typically obtained by conducting the treatment under anhydrous conditions and preferably in the absence of air, e.g. by conducting the treatment under an inert gas such as nitrogen. Suitable inert organic solvents which can be used include, for example, tetrahydrofuran, hexane, diethyl ether, monoglyme, and mixtures of such solvents and the like.

Step $c$ can be conveniently conducted in situ by bubbling anhydrous carbon dioxide through the reaction product solution of the compound of formula $A^{-1}$. The carbon dioxide reaction is typically conducted at temperatures in the range of about from $-78°C$ to room temperature and since the rate of reaction will vary with the flow rate of carbon dioxide, the reaction is preferably monitored by thin-layer chromatography and allowed to proceed until the thin-layer chromatography reveals that thiazol-2-yloxypropanediol acetonide derived from the starting material of formula $A^{-1}$ has been consumed.

The first step of our process is also conveniently conducted in situ by adding a lower alkyl chloroformate directly to the reaction medium, preferably as soon as the preceding reaction has gone to completion. Typically this step is conducted at temperatures in the range of about from $-78°C$ to room temperature for about from 1 hour to 6 hours. Suitable lower alkyl chloroformates which can be used include, for example, methyl chloroformate, ethyl chloroformate, isopropyl chloroformate, t-butyl chloroformate, n-butyl chloroformate and the like. Best results are typically obtained using ethyl chloroformate. Accordingly the above reaction sequence has been shown using ethyl chloroformate although other alkyl chloroformates could also be used. Also typically about from 1.1 to 3 moles of alkyl chloroformate is used per mole of compound of formula A. Where this step is not conducted in situ, the initial starting material of formula A can be dissolved in a suitable inert organic solvent such as, for example, tetrahydrofuran, dioxane, monoglyme, dimethylformamide and the like, and then treated with an alkyl chloroformate as described above.

Step 2 is also conveniently conducted in situ by adding an alkali metal azide, preferably as an aqueous solution, directly to the product reaction mixture of formula B. Typically this step is conducted at temperatures in the range of about from $-10°$ to $30°C$, preferably about from $10°$ to $25°C$, for about from ½ hour to 6 hours, preferably about from ½ hour to 2 hours. Suitable alkali metal azides which can be used include, for example, sodium azide, potassium azide, and lithium azide. Typically best results are obtained using sodium azide.

Step 3 is conveniently effected by adding the compound of formula C to an inert aromatic solvent, such as toluene, and heating the mixture at temperatures in the range of about from $100°$ to $110°C$, preferably about from $105°-108°C$, for about from ½ hour to 2 hours. Also while best results are obtained using these conditions, temperatures and reaction times, both above and below these ranges could also be used. Also other inert solvents such as, for example, xylene and diglyme and the like could also be used.

The isocyanate compounds of formula D can then be used as convenient starting materials for the preparation of the corresponding substituted carbonylamino or substituted -oxy carbonylaminothiazole compounds. This can be represented by the following schematic reaction equation:

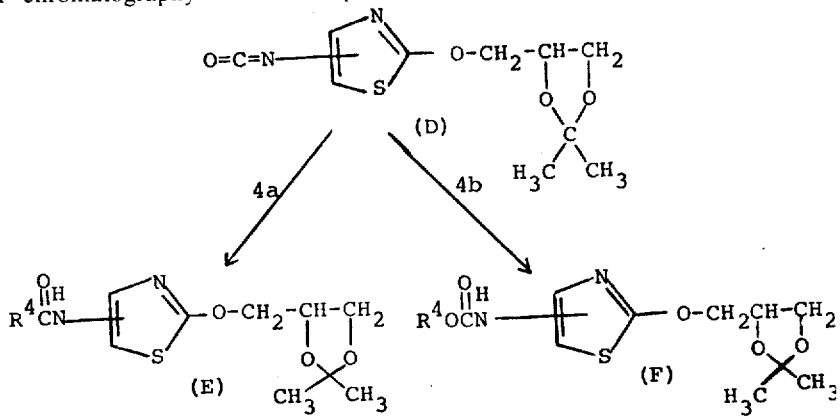

wherein $R^4$ is selected from the group of alkyl having from one through 12 carbon atoms; cycloalkyl having from three through 12 carbon atoms; phenyl; lower phenylalkyl wherein said alkyl has from one through six carbon atoms or substituted phenyl or substituted lower phenylalkyl wherein said phenyl has from one or two substituents independently selected from the group of hydroxy, lower alkyl, lower alkoxy, or halo; terminally substituted group having from two through 12 carbon atoms having one substituted terminal carbon atom having substituent selected from the group of hydroxy, acyloxy having from two through 12 carbon atoms and alkoxy having from one through six carbon atoms; and groups having the formulas $-(CH_2)_{n+1}NR^8R^9$ or $-(CH_2)_nR^{10}$ wherein $n$ is a whole integer of from one through four, $R^8$ and $R^9$ are independently selected from the group of hydrogen and alkyl groups having from one through four carbon atoms and $R^{10}$ is cycloalkyl having from three through eight carbon atoms.

Step 4a can be conveniently effected via a Grignard type reaction by treating the isocyanate product of formula D with a Grignard reagent having the desired $R^4$-substituents. Typically this treatment is conducted at temperatures in the range of about from $-78°$ to $-100°C$, preferably about $-78°C$, for about from 1 minute to ½ hour and preferably about from 1 minute to 15 minutes. Typically the treatment is conducted in an inert solvent such as, for example, toluene, ether (diethyl), tetrahydrofuran, monoglyme and the like, or mixtures thereof. Suitable Grignard reagents which can be used include those having the general formula $R^4MAX'$ wherein $X'$ is chloro, bromo or iodo and $R^4$ is as defined herein above, such Grignard reagents include, for example, 5'-methylhexylmagnesium bromide; 4'-methylhexylmagnesium bromide; methylmagnesium iodide, butylmagnesium chloride; γ-cyclopentylpropylmagnesium bromide; dodecylmagnesium bromide and the like. The Grignard reagent can be prepared according to known procedures, or obvious modifications thereof such as, for example, described in Fieser & Fieser, *Reagents for Organic Synthesis*, pages 415–424 (1967) John Wiley & Sons, Inc.

Also in place of the Grignard reagents, suitable substituted lithium reagents can also be used under the same conditions set forth with respect to Grignard reagents. Suitable substituted lithium reagents are those having the formula $R^{4'}$ Li wherein $R^{4'}$ is alkyl having from one through 12 carbon atoms; cycloalkyl having from three through 12 carbon atoms; phenyl; lower phenylalkyl wherein said alkyl has from one through six carbon atoms or the group having the formula $-(CH_2)_nR^5$ wherein $n$ is a whole integer of from one through four and $R^5$ is cycloalkyl having from three through eight carbon atoms.

Step 4b can be effected by treating the compound of formula D with an alcohol having the desired $R^4O$ group — i.e. $R^4OH$. Although the treatment can be conducted without a solvent (i.e. the alcohol serving of the solvent) the treatment is typically conducted in an inert organic solvent such as, for example, toluene, since this simplifies isolation of the resulting product. Other suitable inert organic solvents which can be used include, for example, xylene, diglyme, dioxane and the like. The treatment is typically conducted at temperatures in the range of about from 95° to 120°C for about from ½ to 4 hours, preferably about from 1 to 2 hours. Typically about from 1 to 50 moles of the alcohol is used, per mole of compound of formula D. Suitable $R^4OH$ alcohols which can be used include, for example, 5-methylhexyl alcohol; 4-methylhexyl alcohol; methanol; phenol; γ-cyclophenylpropyl alcohol; dodecyl alcohol and the like..

The compounds of formulas E and F can be converted into cardiovascular active compounds according to the procedure described by Edwards in U.S. application Ser. No. 451,179, filed on even date herewith, which procedure can be represented by the following schematic overall reaction equation sequence:

Step 1' can be conveniently effected by treating the compound of formula E and F with a suitable organic or inorganic acid, preferably in a suitable inert solvent. Typically this treatment is conducted at temperatures in the range of about from 0° to 65°C and preferably about 25°–30°C, for about from 3 minutes to 18 hours and preferably about from 1 to 4 hours. Suitable inorganic acids which can be used include, for example, hydrochloric acid, hydrobromic acid, sulfuric acid, phosphoric acid and the like. Suitable organic acids which can be used include, for example, formic acid, oxalic acid, acetic acid, propionic acid, and the like. Suitable solvents which can be used include, for example, water, methanol, acetone, monoglyme, ether and the like. Good results are typically obtained by using aqueous formic acid solution.

Step 2' of the above process can be effected by treating the compound of formula G with a suitable phenyl sulfonyl chloride or bromide or alkyl sulfonyl chloride or bromide, in a suitable inert organic solvent in the presence of a base. The particular sulfonyl derivative used is largely immaterial since the sulfonyl substituent is split off during the next step. Typically this treatment is conducted at temperatures in the range of about from 0° to 60°C and preferably about from 0° to 25°C for about from 5 minutes to 18 hours, preferably about from 10 minutes to 45 minutes, using mole ratios in the range of about from 1.0 to 1.1 moles of sulfonyl derivatives per mole of compound of formula G. Suitable phenyl sulfonyl chlorides or bromides which can be used include, for example, benzene, sulfonyl chloride, benzene sulfonyl bromide, or p-toluene sulfonyl chlo-

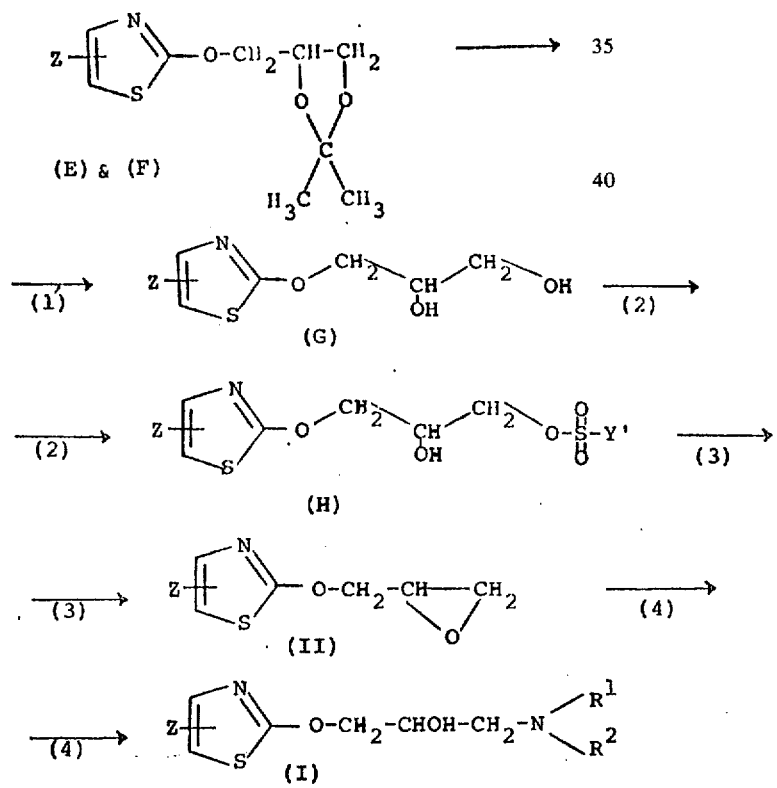

wherein $R^1$ and $R^2$ are independently selected from the group of hydrogen and lower alkyl, $Y'$ is alkyl or phenyl and Z is the group $$R^4\overset{O}{\underset{H}{C}}N- \quad \text{or} \quad R^4O\overset{O}{\underset{H}{C}}N-$$

wherein $R^4$ is as defined herein above.

ride, p-ethyl benzene sulfonyl bromide, and the like. Suitable alkyl sulfonyl chlorides, and bromides, which can be used include, for example, methane sulfonyl chloride, methane sulfonyl bromide and the like. Suitable solvents which can be used include diethyl ether, methyl dichloride, tetrahydrofuran and the like. Also bases such as pyridine can serve as both the base and solvent. Suitable bases which can be used include, for example, pyridine, triethylamine or other tertiary amines, and the like.

Step 3' can be conveniently effected by treating the compound of formula H with a strong base preferably in an inert organic solvent. Conveniently this treatment is conducted by adding a strong base directly to the product reaction mixture of step 2' without separation of the product of formula H from the reaction mixture. Typically this treatment is conducted at temperatures in the range of about from 0° to 100°C, preferably about from 20° to 60°C for from ½ hour to 3 hours, and preferably about from ½ hour to 1 hour. Suitable strong bases which can be used include, for example, alkali metal hydroxides such as, for example, sodium hydroxide, potassium hydroxide, and the like, and alkali metal alkoxides such as, for example, sodium methoxide, potassium methoxide, and alkyl or aryl lithium such as butyl lithium, and the like. Suitable inert organic solvents include, for example, monoglyme, ethyl ether, benzene and the like.

Step 4' can be conducted by treating the intermediate product of formula II with the desired $R^1$, $R^2$ amine or amino derivative. For example by treating the compound of formula II with an alcoholic solution of ammonia, the corresponding compounds of formula I wherein each of $R^1$ and $R^2$ is hydrogen is obtained. Similarly, treatment with a monoalkyl amine will yield the corresponding compound of formula I wherein one of $R^1$ or $R^2$ is the corresponding alkyl group and the other is hydrogen, and where a dialkyl amine is used, each of $R^1$ and $R^2$ will be an alkyl group. Further, although optimum conditions and solvents will vary with the particular intermediate of formula II and ammonia or amino-type derivatives used, the treatment is typically conducted at temperatures in the range of about from 25° to 100°C for about from 10 minutes to 18 hours. Suitable solvents which can be used include, for example, monoglyme, methanol, ethanol, pyridine and the like.

Also although not specifically stated, it should be understood, as would be apparent to one having ordinary skill in the art, that where the starting material for a given step has free hydroxy or free amino groups, which could interfere with the treatment, such groups are preferably protected with conventional labile ester or ether groups by procedures which are well within the scope of the art. For example, with respect to step 2, free hydroxy groups, other than the 1- and 2-hydroxy propane groups, are conveniently protected by treatment with acetic anhydride. The acetate protecting group can then be conveniently removed, after the treatment of step 2, via treatment with a mild base.

Preferably, with the exception of step 3 which, as noted above, is conveniently conducted by direct addition to the product reaction mixture of the preceding step, the respective products of each step are isolated prior to their subsequent use as starting materials for the next succeeding step. Separation and isolation can be effected by any suitable separation or purification procedure such as, for example, evaporation, crystallization, chromatography, thin-layer chromatography, etc. Where an isomer mixture of the product of formula I is obtained the respective optically active (+) and (−) isomers can be resolved, if desired, by conventional procedures. For example, by reacting the compounds of formula I with an optically active acid which will yield pure optical salts of the compounds of formula I and then isolating the respective (+) and (−) optical salts by repeated crystallization.

The pharmaceutically acceptable acid addition salts (e.g. hydrochloride) of the compounds of formula I can be prepared via neutralization of the parent compound, typically via neutralization of an amino moiety, with the desired acid.

The compounds of formula I are useful in the treatment and palliation of cardiovascular abnormalities in mammals. These compounds primarily achieve their therapeutic action by selectively blocking the cardiac $\beta$-adrenergic receptor sites and accordingly, because they are cardiac selective, they can also be applied to treat cardiac abnormalities in patients suffering from asthma or chronic obstructive lung disease. These compounds are especially useful in the treatment or palliation of cardiac arrhythmias, angina pectoris, hypertrophic subaortic stenosis, pheochromocytoma, thyrotoxicosis, hyperkinetic syndromes, tetralogy of Fallot, mitral stenosis with tachycardia, general ischemic conditions, and hypertension founded on elevated cardiac outputs due to a hyperadrenergic state. The compounds are active, both in the treatment or palliation of acute attacks of such cardiac disorders, and further can be applied prophylactically to prevent or reduce the frequency of such attacks. This prophylactic action is particularly desirable in reducing the frequency of attacks of angina pectoris, since the medication (i.e. nitroglycerin) presently commonly used in the treatment of angina pectoris has no recognized prophylactic action.

Additional information concerning the use, action and determination of $\beta$-blockers can be obtained by reference to the literature such as, for example, Dotlery et al., *Clinical Pharmacology and Therapeutics*, volume 10, No. 6, 765–797 and the references cited therein.

The compounds of formula I can be administered in a wide variety of dosage forms, either alone or in combination with other pharmaceutically compatible medicaments, in the form of pharmaceutical compositions suited for oral or parenteral administration. The compounds are typically administered as pharmaceutical compositions consisting essentially of the pharmaceutically acceptable salts of the compounds of formula I and a pharmaceutical carrier. The pharmaceutical carrier can be either a solid material or liquid, in which the compound is dissolved, dispersed or suspended, and can optionally contain small amounts of preservatives and/or pH-buffering agents. Suitable preservatives which can be used include, for example, benzyl alcohol and the like. Suitable buffering agents include, for example, sodium acetate and pharmaceutical phosphate salts and the like.

The liquid compositions can, for example, be in the form of solutions, emulsions, suspensions, syrups or elixirs and optionally can contain small quantities of preservatives and/or buffering agents.

The solid compositions can take the form of tablets, powders, capsules, pills or the like, preferably in unit dosage forms for simple administration or precise dosages. Suitable solid carriers include, for example, pharmaceutical grades of starch, lactose, sodium saccharin, sodium bisulfite and the like.

The compounds of formula I are typically administered in dosages of about from 0.01 to 5 mg. per kg. of body weight. The precise effective dosage will, of course, vary depending upon the mode of administration, the condition being treated and the host. Preferably, the compounds are administered orally, either as solid compositions, e.g. tablets, or liquids as described herein above.

DEFINITIONS

As used herein above and below, the following terms shall have the following meaning unless expressly stated to the contrary. The term alkyl, or alkylene, refers to both straight and branched chain alkyl groups. Where primed numerals are used with respect to alkyl groups, branched alkyl groups are meant with the primed numerals designating the position of lesser alkyl groups on the longer primary alkyl chain. Thus, for example, the term 5'-methylhexyl refers to the group

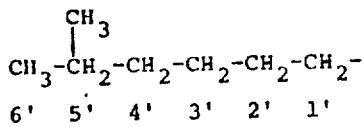

The term lower alkyl refers to both straight and branched chain alkyl groups having a total of from one through six carbon atoms and thus includes primary, secondary, and tertiary alkyl groups. Typical lower alkyls include, for example, methyl, ethyl, n-propyl, isopropyl, n-butyl, t-butyl, n-hexyl and the like. The term cycloalkyl refers to cyclic hydrocarbon groups having from three through 12 carbon atoms and preferably three through seven carbon atoms such as, for example, cyclopropyl, cyclopentyl, cycloheptyl and the like. The term alkenyl refers to monoethylenically unsaturated aliphatic groups and the term lower alkenyl refers to such groups having from two through six carbon atoms and wherein the double bond can be between any two adjacent carbon atoms. Typical lower alkenyl groups include, for example, vinyl, propenyl, and the like. The term alkoxy refers to groups having the formula R'O wherein R' is alkyl and correspondingly the term lower alkoxy refers to the group having the formula R'O— wherein R' is lower alkyl. Typical alkoxy groups include, for example, methoxy, ethoxy, t-butoxy and the like. The term (lower alkoxy) lower alkyl or perhaps more correctly (lower alkoxy) lower alkylene refers to the group —R'—OR'' wherein R' is lower alkylene and OR'' is lower alkoxy. The term hydroxy lower alkyl or hydroxy lower alkylene refers to groups having the formula HOR'— wherein R' is lower alkylene. Typical hydroxyalkyl or hydroxyalkylene groups include, for example, α-hydroxyethylene, β-hydroxypropylene, hydroxyisopropylene and the like. The term terminally substituted alkyl (or alkylene) refers to alkylene groups having from two through 12 carbon atoms in which the terminal carbon atom, or in the case of groups, such as t-butyl, which have more than one terminal carbon, wherein one of such terminal carbon atoms are substituted with from one through three substituents independently selected from the group of hydroxy, acyloxy and alkoxy. Typical terminally substituted alkyl groups include 2-hydroxy-ethylene, 3-acetoxypropyl, β-methoxyethylene and the like. The term carboxy refers to the group -COOH. The term halo refers to iodo, bromo, chloro and fluoro groups. The term acyl refers to acyl groups derived from carboxylic acids having from two through 12 carbon atoms such as acetyl, propionyl, butyryl, valeryl, isovaleryl, hexanoyl, heptanoyl, octanoyl, nonanoyl, undecanoyl, lauroyl, benzoyl, phenylacetyl, phenylpropionyl, o-, m-, p-toluoyl, β-cyclopentylpropionyl, formyl and the like.

The term alkoxycarbonyl refers to groups having the formula

wherein R'$_3$ is an alkyl group having from one through 11 carbon atoms. Typical alkoxycarbonyl groups thus include, for example, methoxycarbonyl, propoxycarbonyl, isopropoxycarbonyl, undecanoxycarbonyl and the like. The term acyloxy refers to groups derived from carboxylic acids having from two through 12 carbon atoms such as acetyloxy, propionyloxy, butyryloxy, valeryloxy, isovaleryloxy, hexanoyloxy, heptanoyloxy, octanoyloxy, nonanoyloxy, undecanoyloxy, lauroyloxy, benzoyloxy, phenylacetyloxy, phenylpropionyloxy, o-, m-, p-toluoyloxy, β-cyclopentylpropionyloxy and the like.

The term aryl refers to phenyl or substituted phenyls as defined herein below. By the term alkylaryl is meant an alkyl substituted phenyl group having one or more alkyl substituents and having up to 12 carbon atoms such as o-tolyl, m-tolyl, p-isopropylphenyl, 2,3-dimethylphenyl, 3,5-dimethylphenyl and the like. The term lower phenylalkyl refers to an alkyl group having from one through six carbon atoms and having a phenyl substituent. The term substituted lower phenylalkyl refers to an alkyl group having one through six carbon atoms and having a substituted phenyl (as defined herein) substituent. The term arylalkyl refers to the group of lower phenylalkyl and substituted lower phenylalkyl inclusive. The term substituted phenyl refers to phenyl groups which have one or two substituents independently selected from the group of para positions with a hydroxy, lower alkyl, lower alkoxy or halo groups. Typical substituted phenyl groups include, for example, p-hydroxyphenyl, p-ethylphenyl, p-t-butoxyphenyl, p-fluorophenyl, p-chlorophenyl and the corresponding ortho and meta isomers, 3,4-dimethoxyphenyl, 3-bromo-4-chlorophenyl and the like.

The term alkylamino refers to the group having the formula R'HN wherein R' is alkyl and the term lower alkylamino refers to such groups wherein R' is lower alkyl. The term dialkylamino refers to the group having the formula R$_1$'R$_2$'N— wherein R$_1$' and R$_2$' are independently alkyl. Typical lower dialkylamino groups include, for example, dimethylamino, N-methyl-N-ethylamino, diethylamino, N-t-butyl-N-isopropylamino and the like.

The term substituted amido (e.g. alkylamido) or substituted carbonylamino (e.g. alkylcarbonylamino) or acylamino refer to the group having the formula

wherein R$^4$ is as defined herein. The term N-(substituted)-substituted amido or N-(substituted)-substituted carbonylamino or N-substituted acylamino refer to groups having the formula

wherein $R^3$ and $R^4$ is as defined herein above. Typical groups having the formula

include, for example, N-heptyl-acetamido or N-heptyl acetylamino; or N-heptyl-methylcarbonylamino; N-methyl-heptylcarbonylamino, and the like.

The term substituted-oxy carbonylamino (e.g. alkoxycarbonylamino; phenoxycarbonylamino refers to the group having the formula $$R^4O\overset{O}{\underset{H}{C}}N-$$

wherein $R^4$ is as defined herein. The term N-substituted-substituted-oxy carbonylamino (e.g. N-alkyl-alkoxycarbonylamino; N-alkylphenoxycarbonylamino refers to groups having the formulas

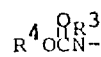

wherein $R^3$ and $R^4$ are as defined herein. Typical

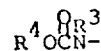

groups include, for example, N-methyl-heptoxycarbonylamino, N-heptyl-t-butoxycarbonylamino and the like.

A further understanding of the invention can be had from the following non-limiting Preparations and Examples. Also as used herein above and below unless expressly stated to the contrary, all temperatures and temperature ranges refer to the Centigrade system and the terms ambient or room temperature refer to about 20°C. The term percent or (%) refers to weight percent. The term equivalent refers to a quantity of reagent equal in moles to the moles of the preceding or succeeding reactant recited in that Preparation or Example in terms of moles or finite weight or volume. Also unless expressly stated to the contrary, racemic mixtures are used as starting materials and correspondingly racemic mixtures are obtained as products and where necessary, preparations and examples are repeated to provide sufficient quantities of starting materials for subsequent preparations and examples.

PREPARATION 1

3-(5-Bromothiazol-2-oxy)-propanediol acetonide

In this preparation sodium hydride (18 g., 56 wt. % dispersion in oil) is washed with n-hexane, and the hexane is replaced with monoglyme (100 ml.). To this mixture is added a solution of glycerol acetonide (44.5 g.) in monoglyme (200 ml.) under an atmosphere of nitrogen. After 15 minutes, 2,5-dibromothiazole (32 g.) is added, and the mixture is refluxed for 1.25 hours. The reaction mixture is then cooled, diluted with ether and filtered. The filtrate is washed with saturated aqueous sodium chloride twice, dried and concentrated by evaporation. Fractional distillation yields 3-(5-bromothiazol-2-oxy)-propanediol 1,2-acetonide.

Similarly 3-(4-bromothiazol-2-oxy)-propanediol 1,2-acetonide is prepared by following the same procedure but replacing 2,5-dibromothiazole with 2,4-dibromothiazole.

EXAMPLE A

Examples A–E illustrate procedures according to the invention (including the preparation of related intermediates in Examples C and E).

In this example 150 ml. of a butyllithium, in hexane, solution (each ml. of solution contains 100 mg. of butyllithium) is cooled to −78°C and then added to a solution containing 60 g. of 3-(5-bromothiazol-2-oxy)-propanediol 1,2-acetonide in 200 ml. of anhydrous tetrahydrofuran at −78°C under a nitrogen atmosphere. The resultant mixture is maintained at −78°C for 15 minutes affording 3-(5-lithiothiazol-2-oxy)-propanediol 1,2-acetonide salt. A stream of anhydrous carbon dioxide is then passed through the product solution. The mixture is periodically sampled and monitored by thin-layer chromatography and the carbon dioxide treatment continued until all of the starting material is consumed (about 2 hours). Thirty grams of ethyl chloroformate is then added to the reaction mixture and the temperature of the resulting mixture allowed to rise to room temperature and allowed to stand at room temperature for 3 hours. An aqueous solution containing 50 g. of sodium azide in 100 ml. of water is then added and the resulting mixture stirred vigorously for 50 minutes. The tetrahydrofuran solvent is then distilled off at 50°C and the resulting residue is then washed with diethyl ether and then with water affording a crude residue of 3-(5-azidocarbonylthiazol-2-oxy)-propanediol 1,2-acetonide. The crude residue is then further purified by chromatography over aluminum oxide (neutral, activity III) eluting with a gradient system of 3,000 ml. of hexane and 3,000 ml. of benzene.

Similarly by following the same procedure but using 3-(4-bromothiazol-2-oxy)-propanediol 1,2-acetonide as the starting material, the corresponding 3-(4-azidocarbonylthiazol-2-oxy)-propanediol 1,2-acetonide is prepared.

EXAMPLE B

In this example a Grignard reagent is prepared by adding 5 g. of γ-cyclopentylpropyl bromide to a suspension of 700 mg. of magnesium in 100 ml. of anhydrous ethyl ether at room temperature under an argon atmosphere. The resulting exothermic reaction is allowed to go to completion affording a liquid mixture containing the Grignard reagent γ-cyclopentylpropylmagnesium bromide, which is then cooled and maintained at −78°C.

3-(5-Isocyanatothiazol-2-oxy)-propanediol 1,2-acetonide is prepared by adding 5.5 g. of 3-(5-azidocarbonylthiazol-2-oxy)-propanediol 1,2-acetonide to 100 ml. of anhydrous toluene. The mixture is then heated, under an argon atmosphere, at 108°C for 40 minutes. The resulting mixture is then cooled to −78°C and added to the γ-cyclopentylpropylmagnesium bromide diethyl ether solution previously prepared. The combined reaction mixture is allowed to react for one minute and then 2 ml. of water is added and the temperature of the mixture allowed to rise to room temperature. The resulting product mixture is then filtered, dried over sodium sulfate, filtered, and evaporated to dryness affording a residue which is then further purified by plate chromatography eluting with a system of 5% methanol-95% chloroform yielding 3-(5-γ-cyclopentylpropylcarbonylaminothiazol-2-oxy)-propanediol 1,2-acetonide.

Similarly by following the same procedure but substituting the appropriate Grignard reagents, the following compounds are repsectively prepared:
- 3-(5-5'-methylhexylcarbonylaminothiazol-2-oxy)-propanediol 1,2-acetonide;
- 3-(5-3'-methylhexylcarbonylaminothiazol-2-oxy)-propanediol 1,2-acetonide;
- 3-(5-4'-methylhexylcarbonylaminothiazol-2-oxy)-propanediol 1,2-acetonide;
- 3-(5-4'-ethylhexylcarbonylaminothiazol-2-oxy)-propanediol 1,2-acetonide;
- 3-(5-3'-propylhexylcarbonylaminothiazol-2-oxy)-propanediol 1,2-acetonide;
- 3-(5-n-heptylcarbonylaminothiazol-2-oxy)-propanediol 1,2-acetonide;
- 3-(5-β-cyclopentylethylcarbonylaminothiazol-2-oxy)-propanediol 1,2-acetonide;
- 3-(5-4'-cyclopentylbutylcarbonylaminothiazol-2-oxy)-propanediol 1,2-acetonide;
- 3-(5-γ-cyclohexylpropylcarbonylaminothiazol-2-oxy)-propanediol 1,2-acetonide;
- 3-(5-methylcarbonylaminothiazol-2-oxy)-2-propanediol 1,2-acetonide;
- 3-(5-t-butylcarbonylaminothiazol-2-oxy)-propanediol 1,2-acetonide;
- 3-(5-n-hexylcarbonylaminothiazol-2-oxy)-propanediol 1,2-acetonide;
- 3-(5-benzylcarbonylaminothiazol-2-oxy)-propanediol 1,2-acetonide.

Similarly by following the same procedure but using the corresponding 4-position isomers, the corresponding 4-position isomer is respectively prepared.

EXAMPLE C

In this example 1.1 equivalent of butyllithium in 25 ml. of hexane is added to a solution containing 0.5 g. of 3-[5-γ-cyclopentylpropylcarbonylaminothiazol-2-oxy]-propanediol 1,2-acetonide in 25 ml. of tetrahydrofuran at −78°C. Ten equivalents of methyl iodide is then added and the resulting mixture allowed to stand for 50 minutes and then refluxed for 5 hours. The mixture is then filtered, dried over sodium sulfate and evaporated to dryness affording a crude residue of 3-[5-N'-methyl-γ-cyclopentylpropylcarbonylaminothiazol-2-oxy]-propanediol 1,2-acetonide which is then further purified by thin-layer chromatography.

Similarly by following the same procedure using the products of Example B as starting materials, the corresponding N'-methyl derivatives of the products of Example B are respectively prepared.

Similarly by following the same procedure but using in place of methyl chloride, the following compounds 5'-methylhexyl chloride, 4'-methylhexylbromide, phenyl bromide, γ-cyclopentylpropyl bromide, and ethyl iodo, the corresponding N'-methylhexyl, N'-phenyl, N-γ-cyclopentylpropyl and N-ethyl derivatives are respectively prepared.

EXAMPLE D 3-(5-γ-cyclopentylpropoxycarbonylaminothiazol-2-oxy)-propanediol 1,2-acetonide.

In this example 5.2 g. of 3-(5-azidocarbonylthiazol-2-oxy)-propanediol 1,2-acetonide is added to a mixture of 100 ml. of anhydrous toluene and 4 ml. of γ-cyclopentylpropanol. The resulting mixture is heated for 1 hour at 107°C and then the solvent distilled off under reduced pressure affording a crude residue of 3-(5-γ-cyclopentylpropoxycarbonylaminothiazol-2-oxy)-propanediol 1,2-acetonide which is then further purified by chromatography.

Similarly by following the same procedures using the corresponding substituted alcohol starting materials, the following compounds are respectively prepared:
- 3-(5-5'-methylhexoxycarbonylaminothioazol-2-oxy)-propanediol 1,2-acetonide;
- 3-(5-4'-methylhexoxycarbonylaminothiazol-2-oxy)-propanediol 1,2-acetonide;
- 3-(5-3'-methylhexoxycarbonylaminothiazol-2-oxy)-propanediol 1,2-acetonide;
- 3-(5-4'-methylhexoxycarbonylaminothiazol-2-oxy)-propanediol 1,2-acetonide;
- 3-(5-4'-ethylhexoxycarbonylaminothiazol-2-oxy)-propanediol 1,2-acetonide;
- 3-(5-3'-propylhexoxycarbonylaminothiazol-2-oxy)-propanediol 1,2-acetonide;
- 3-(5-n-heptoxycarbonylaminothiazol-2-oxy)-2-propanediol 1,2-acetonide;
- 3-(5-γ-cyclopentylpropoxycarbonylaminothiazol-2-oxy)-propanediol 1,2-acetonide;
- 3-(5-γ-cyclohexylpropoxycarbonylaminothiazol-2-oxy)-propanediol 1,2-acetonide;
- 3-(5-methoxycarbonylaminothiazol-2-oxy)-propanediol 1,2-acetonide;
- 3-(5-t-butoxycarbonylaminothiazol-2-oxy)-propanediol 1,2-acetonide;
- 3-(5-n-hexoxycarbonylaminothiazol-2-oxy)-propanediol 1,2-acetonide; and
- 3-(5-benzyloxycarbonylaminothiazol-2-oxy)-propanediol.

Similarly by following the same procedure but using the 4-position azidocarbonylthiazole isomer as starting material, the corresponding 4-position isomers of the above compounds are respectively prepared.

EXAMPLE E

In this example 1.1 equivalents of butyllithium in hexane is added to a solution containing 500 mg. of 3-(5-γ-cyclopentylpropoxycarbonylaminothiazol-2-oxy)-propanediol 1,2-acetonide in 25 ml. of tetrahydrofuran at −78°C. Ten equivalents of methyl iodide is then added and the resulting mixture allowed to stand for 50 minutes and then heated at reflux for 5 hours. The mixture is then filtered, dried over sodium sulfate and evaporated to dryness affording a crude residue of 5-(5'-methyl-γ-cyclopentylpropoxycarbonylaminothiazol-2-oxy)-propanediol 1,2-acetonide which is then further purified by chromatography.

Similarly by following the same procedure using the products of Example D as starting materials, the corresponding N'-methyl derivatives of the products of Example D are respectively prepared.

Similarly by following the same procedure but using in place of methyl chloride, the following compounds

15

5'-methylhexyl chloride, 4-methylhexyl bromide, phenyl bromide, γ-cyclopentylpropyl bromide, and ethyl iodo, the corresponding N'-methylhexyl, N'-phenyl, N'-γ-cyclopentylpropyl, and N'-ethyl derivatives are respectively prepared.

EXAMPLE 1

Examples 1-3 illustrate methods according to the procedure described by Edwards in U.S. Ser. No. 451,179, filed on even date herewith for preparing cardiovascular agents from the intermediate prepared according to our invention.

In this example a mixture containing 2 g. of 3-(5-4'-methylhexylaminocarbonylthioazol-2-oxy)-propanediol 1,2-acetonide in 5 ml. of 80% aqueous formic acid is stirred at room temperature for five minutes. The solution is then evaporated under vacuum at room temperature affording a residue of 3-(5-4'-methylhexylaminocarbonylthiazol-2-oxy)-1,2-propanediol which is then further purified by recrystallization using an ethyl acetate-hexane mixture.

Similarly, by following the same procedure, the products prepared according to Examples B-E are respectively cleaved to the corresponding propanediol compounds.

EXAMPLE 2

In this example 0.6 g. of methylsulfonyl chloride is added with rapid stirring to a mixture containing 1.2 g. of 3-(5-4'-methylhexylaminocarbonylthiazol-2-oxy)-propanediol in 20 ml. of pyridine at −30°C. The mixture is then allowed to warm to room temperature and evaporated to dryness affording a residue of 2-hydroxy-1-methylsulfonyloxy-3-(5-4'-methylhexylaminocarbonylthiazol-2-oxy)-propane.
The residue is then dissolved in 50 ml. of anhydrous methanol and cooled to 0°C. A mixture containing 1 g. of sodium methoxide in 10 ml. of anhydrous methanol is added and the resulting mixture stirred for two minutes and then evaporated to remove methanol. 100 Milliliters of ethyl acetate is added and the resulting ethyl acetate mixture washed three times with water, dried over magnesium sulfate, and evaporated affording a residue of 1,2-epoxy-3-(5-4'-methylhexylaminocarbonylthiazol-2-oxy)-propane as an oily residue.

Similarly, by following the same procedure as above, the products, prepared according to Example 1, are converted to the corresponding 1,2-epoxypropane thiazole compounds.

EXAMPLE 3

In this example 0.6 g. of isopropylamine is added to a solution containing 0.3 g. of 1,2-epoxy-3-(5-4'-methylhexylaminocarbonylthiazol-2-oxy)-propane in 20 ml. of anhydrous absolute ethanol, and then allowed to stand for 12 hours at room temperature. The mixture is then evaporated to dryness and the resulting residue is then chromatographed on silica gel yielding 1-isopropylamino-3-(5-4'-methylhexylaminocarbonylthiazol-2-oxy)-2-propanol.

Similarly, by following the above procedure but respectively using the products prepared according to Example 2 as starting materials, the corresponding 1-isopropylamino derivatives are respectively prepared.

Similarly, by following the same procedure but using t-butylamine in place of isobutylamino the corresponding 1-t-butylamino derivatives are prepared using each of the products prepared in Example 2 as starting materials.

Obviously many modifications and variations of the invention, described herein above and in the claims, can be made without departing from the essence and scope thereof.

What is claimed is:

1. A process for preparing a compound selected from the group having the formulas:

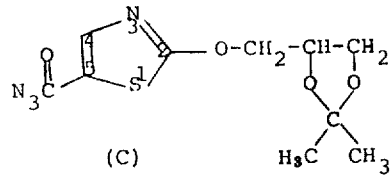

(C)

and

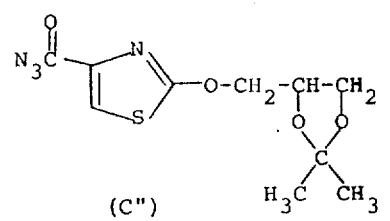

(C")

which comprises the steps of:
a. reacting the corresponding 4'- or 5'-substituted thiazole salt compound having the formula:

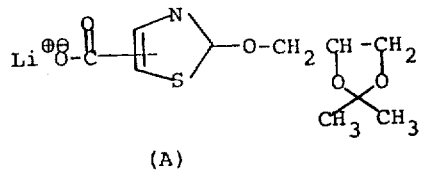

(A)

with a lower alkyl chloroformate in an inert organic solvent at temperatures in the range of about from −78° to 20°C., thereby affording the corresponding 4- or 5-lower alkoxycarbonyloxycarbonylthiazole derivative; and
b. treating the product reaction mixture of step (a) in situ with an alkali metal azide under reactive conditions at temperatures in the range of about from −10° to 30°C, thereby yielding the corresponding compound of formula C or C''.

2. The process of claim 1 wherein said lower alkyl chloroformate of step (a), is ethyl chloroformate.

3. The process of claim 1 wherein said alkali metal azide of step (b), is sodium azide.

4. The process of claim 1 wherein said starting material of formula A is prepared by reacting the corresponding 3-(4- or 5-bromothiazol-2-oxy)-propanediol 1,2-acetonide with butyllithium in an inert organic solvent under reactive conditions at temperatures in the range of about from −10° to −150°C to yield the corresponding 3-(4- or 5-lithiothiazol-2-oxy)-propanediol 1,2-acetonide and then passing anhydrous carbon dioxide through the reaction mixture to yield the corresponding compound of formula A; and wherein step (a) of claim 1 is conducted in situ by adding said lower alkyl chloroformate directly to the product reaction mixture upon essentially complete consumption of said lithium salt.

5. The process of claim 4 wherein said organic solvent is tetrahydrofuran and wherein said lower alkyl chloroformate is ethyl chloroformate.

6. A process for preparing compounds selected from the group of 3-(5-isocyanatothiazol-2-oxy)-propanediol 1,2-acetonide and 3-(4-isocyanatothiazol-2-oxy)-propanediol 1,2-acetonide which comprises the steps of:

a. reacting the corresponding compound having the formula:

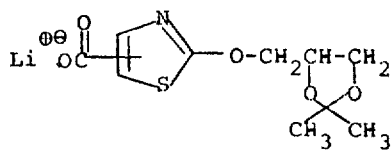

with a lower alkyl chloroformate in an inert organic solvent at temperatures in the range of about from −78° to 20°C., thereby affording the corresponding 4- or 5-lower alkoxycarbonyloxycarbonylthiazole derivative; and b. treating the product mixture of step (a) in situ with an alkali metal azide under reactive conditions at temperatures in the range of about from −10° to 30°C, to yield the corresponding 3-(5-azidocarbonylthiazol-2-oxy)-propanediol 1,2-acetonide product, and c. separating the product of step (b) and adding it to an inert organic aromatic solvent and heating the resulting mixture at temperatures in the range of about from 100° to 110°C to yield the corresponding 5- or 4-isocyanatothiazole product.

7. The process of claim 6 wherein a $R^4OH$ alcohol is added to said inert aromatic solvent whereby said isocyanatothiazole product is simultaneously converted to the corresponding compound having the formula:

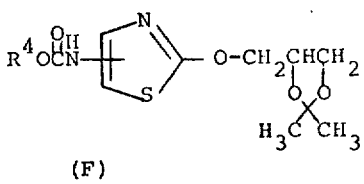

(F)

wherein $R^4$ corresponds to the alcohol substituent.

8. The process of claim 6 wherein step (c) is conducted at the reflux.

9. A process for preparing compounds having the formula

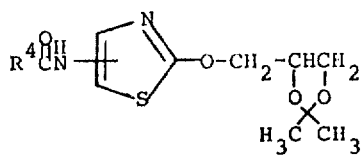

wherein the group

is at the 4- or 5- position of the thiazole ring and $R^4$ is selected from the group of alkyl having from one through 12 carbon atoms; cycloalkyl having from three through 12 carbon atoms; phenyl; lower phenylalkyl wherein said alkyl has from one through six carbon atoms, or substituted phenyl or substituted lower phenylalkyl wherein said phenyl has one or two substituents independently selected from the group of hydroxyl, lower alkyl, lower alkoxy, or halo; terminally substituted alkyl group having from two through 12 carbon atoms having one substituted terminal carbon atom having a substituent selected from the group of hydroxy, acyloxy having from two through 12 carbon atoms and alkoxy having from one through six carbon atoms; and groups having the formulas $-(CH_2)_{n+1}NR^8R^9$ or $-(CH_2)_nR^{10}$ wherein $n$ is a whole integer of from one through four, $R^8$ and $R^9$ are independently selected from the group of hydrogen and alkyl groups having from one through four carbon atoms and $R^{10}$ is cycloalkyl having from three through eight carbon atoms;

which comprises the steps of:

a. reacting the corresponding compound having the formula:

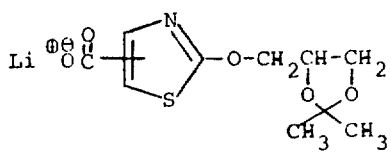

with a lower alkyl chloroformate in an inert organic solvent at temperatures in the range of about from −78°C. to 20°C, thereby affording the corresponding 4- or 5-lower alkoxycarbonyloxycarbonylthiazole derivative; and b. treating the product mixture of step (a) in situ with an alkali metal azide under reactive conditions at temperatures in the range of about from −10° to 30°C, to yield the corresponding 3-(5-azidocarbonylthiazol-2-oxy)-propanediol 1,2-acetonide product; and c. separating the product of step (b) and adding it to an inert organic aromatic solvent and heating the resulting mixture at temperatures in the range of about from 100° to 110°C to yield the corresponding 5- or 4-isocyanatothiazole product; and d. reacting the product of step (c) with a compound selected from the group having the formulas:

$R^4MgX'$ and $R^4$  Li wherein X' is chloride, bromide or iodide, $R^4$ is as defined herein above, and $R^4$ is alkyl having from one through 12 carbon atoms; cycloalkyl having from three through 12 carbon atoms; phenyl; lower phenylalkyl wherein said alkyl has from one through six carbon atoms or the group having the formula $-(CH_2)_nR^5$ wherein $n$ is a whole integer of from 1 through 4 and $R^5$ is cycloalkyl having from 3 through 8 carbon atoms, in an inert organic solvent at temperatures in the range of about from −100° to −78°C. thereby yielding the corresponding compound of formula E.

* * * * *